United States Patent
Tosato

(10) Patent No.: US 8,737,518 B2
(45) Date of Patent: May 27, 2014

(54) WIRELESS COMMUNICATION APPARATUS AND METHOD

(75) Inventor: Filippo Tosato, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 325 days.

(21) Appl. No.: 12/940,329

(22) Filed: Nov. 5, 2010

(65) Prior Publication Data

US 2011/0111747 A1 May 12, 2011

(30) Foreign Application Priority Data

Nov. 6, 2009 (GB) .................... 0919533.0

(51) Int. Cl.
H04L 27/00 (2006.01)

(52) U.S. Cl.
USPC .......................... 375/295; 375/267

(58) Field of Classification Search
USPC ......... 375/299, 347–349, 144, 148, 262, 265, 375/260, 267, 295
See application file for complete search history.

(56) References Cited

U.S. PATENT DOCUMENTS

| | | | |
|---|---|---|---|
| 2007/0254597 A1* | 11/2007 | Li et al. ............................ | 455/69 |
| 2007/0291868 A1* | 12/2007 | Olesen et al. ................... | 375/267 |
| 2008/0080449 A1* | 4/2008 | Huang et al. .................... | 370/342 |
| 2009/0046569 A1* | 2/2009 | Chen et al. ...................... | 370/203 |
| 2009/0274229 A1 | 11/2009 | Mihota | |
| 2009/0323851 A1* | 12/2009 | Ling et al. ...................... | 375/267 |
| 2011/0080965 A1* | 4/2011 | Liu et al. ........................ | 375/260 |
| 2012/0076032 A1* | 3/2012 | Mundarath et al. ............ | 370/252 |
| 2012/0269279 A1* | 10/2012 | Khojastepour ................ | 375/267 |

FOREIGN PATENT DOCUMENTS

| | | |
|---|---|---|
| JP | 2004-201296 A | 7/2004 |
| JP | 2008-512951 A | 4/2008 |
| JP | 2008-306713 A | 12/2008 |
| WO | WO 03/100986 A2 | 12/2003 |
| WO | WO 2008/011451 | 1/2008 |
| WO | WO 2009/085490 A1 | 7/2009 |

OTHER PUBLICATIONS

Japanese Office Action Issued Jun. 12, 2012 in Patent Application No. 2010-249562 (with English translation).
Yusuke Ohwatari et al., "A Study on Reduction Schemes of Feedback Amount in MIMO-OFDM Eigenbeam-Space Division Multiplexing Systems", the Institute of Electronics, Information and Communication Engineers, vol. 106, No. 477, Jan. 19, 2007, pp. 73-78.
Search Report issued in British Application No. GB0919533.0 on Feb. 18, 2010.

* cited by examiner

Primary Examiner — Emmanuel Bayard
(74) Attorney, Agent, or Firm — Oblon, Spivak, McClelland, Maier & Neustadt, L.L.P.

(57) ABSTRACT

A data compression process is described, for compressing channel state information to be fed back to a transmitter. The process involves arranging the data as a matrix comprising a number of orthonormal vectors derived from a channel matrix, determining a singular value decomposition of a subset of the orthonormal matrix to generate matrices respectively of left and right singular vectors, the number of vectors in the subset being equal to the order of the vectors, and right multiplying the remainder orthonormal vectors not included in the singular value decomposition by a matrix product of the matrix of right singular vectors and the matrix of left singular vectors to generate a matrix of compressed data.

12 Claims, 5 Drawing Sheets

WIRELESS COMMUNICATION APPARATUS AND METHOD

FIELD

Embodiments described herein relate to signalling channel state information in a wireless communication network, particularly, but not exclusively, the compression of channel state information to reduce overhead required for transmission of the same.

BACKGROUND

Wireless communications standards are in a continuous cycle of revision and development, as improvements to various communications techniques become known. One strand of telecommunications standards to which this statement applies is the 3GPP series of standards. Revision 10 of this series is known as LTE-Advanced (Long term evolution).

DETAILED DESCRIPTION

Figure 1:
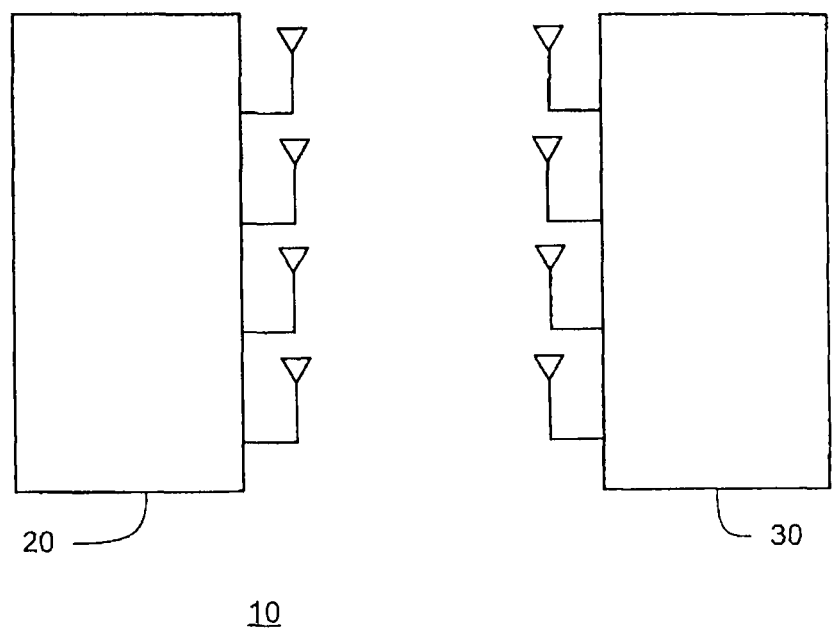
FIG. 1 is a schematic diagram of a wireless communications network in accordance with a first embodiment of the invention.

Spectral efficiency is an area of concern in this field of technology. This is a measure of the extent to which an available bandwidth is being used to its theoretical maximum information capacity. This is becoming particularly relevant in view of the considerable growth in usage of wireless communication, which has increased demand for bandwidth and therefore has made higher spectral efficiency more desirable.

CoMP involves the cooperation of two or more base nodes in scheduling resources and/or generating and broadcasting a signal for downlink transmission. Two main CoMP modes have been identified, namely cooperative beamforming (CB) and joint processing (JP).

In CB, a cooperating cell that is equipped with multiple transmit antennas chooses transmit beam(s) by suitably trading between precoding gain to a served terminal (user equipment—UE) and interference reduction with respect to a 'victim' UE served by an adjacent cell. Similarly, JP involves serving data packets to multiple UEs from multiple cell sites, wherein antenna weights at different cells are chosen to achieve simultaneous coherent channel combining and transmit interference nulling.

Deployment scenarios in which CoMP is deemed to deliver a substantial boost in network capacity and user experience include high interference heterogeneous networks, where the traditional macrocell network coexists with one or more types of non-traditional nodes such as femto-cells in closed subscriber loop (CSG), hotzone (pico) cells in open subscriber group (OSG) and relay nodes lacking a wired backhaul connection.

Similar to closed loop precoding in LTE (Release 8), transmit interference nulling relies on channel state feedback from the UE. However, interference nulling requires more accurate channel information in comparison with basic LTE Rel 8 precoding, as widely acknowledged by many recent contributions in the 3GPP RAN1.

According to one embodiment, a method of compressing data for transmission across a communications channel, the data representing channel conditions for the communications channel in the opposite direction, comprises arranging the data as a matrix comprising a number of orthonormal vectors derived from a channel matrix, determining a singular value decomposition of a subset of the orthonormal matrix to generate matrices respectively of left and right singular vectors, the number of vectors in the subset being equal to the order of the vectors, and right multiplying the remainder orthonormal vectors not included in the singular value decomposition by a matrix product of the matrix of right singular vectors and the matrix of left singular vectors to generate a matrix of compressed data.

Another embodiment provides a method of decompressing compressed data, said data being arranged as a square matrix, comprising determining a singular value decomposition of the square matrix, constructing a matrix Y' comprising:

$$Y' = \begin{pmatrix} V_1(I_p - \Sigma_s^2)^{1/2} V_1^\dagger \\ U_1 \Sigma_s V_1^\dagger \end{pmatrix}$$

where $V_1$ is a right singular value matrix resultant from said singular value decomposition, $U_1$ is a left singular value matrix resultant from said singular value decomposition, and $\Sigma_s$ is a diagonal matrix resultant from said singular value decomposition.

Another embodiment provides a method for compressing the representation of a set of channel eigenvectors, in a channel state information (CSI) feedback scheme, whereby the original number of coefficients is reduced without distorting the vector space spanned by the set of eigenvectors.

Another embodiment comprises a method of decoding a channel representation comprising reversing the above operations to reconstruct the orthonormal n×p matrix from a (n−p)×p block.

Although all of the above examples specify apparatus supplied to perform specific operations, the reader will appreciate that other embodiments may comprise computer program products. For instance, a computer program product could be provided to configure a computer to operate as a transmitter as previously described. A computer program product could be provided to configure a general purpose radio communications device to operate as a receiver as previously specified. This particularly applies to a general purpose radio communications device suitable for configuration in line with the general provisions of software defined radio.

The computer program product could be provided as a storage means, storing computer executable instructions. Alternatively the computer program produce could be provided as a signal receivable by a computer to cause the computer to become suitably configured.

The computer program product may comprise instructions representative of a complete computer program, or may comprise instructions representative of an update to an existing computer program.

Figure 2:
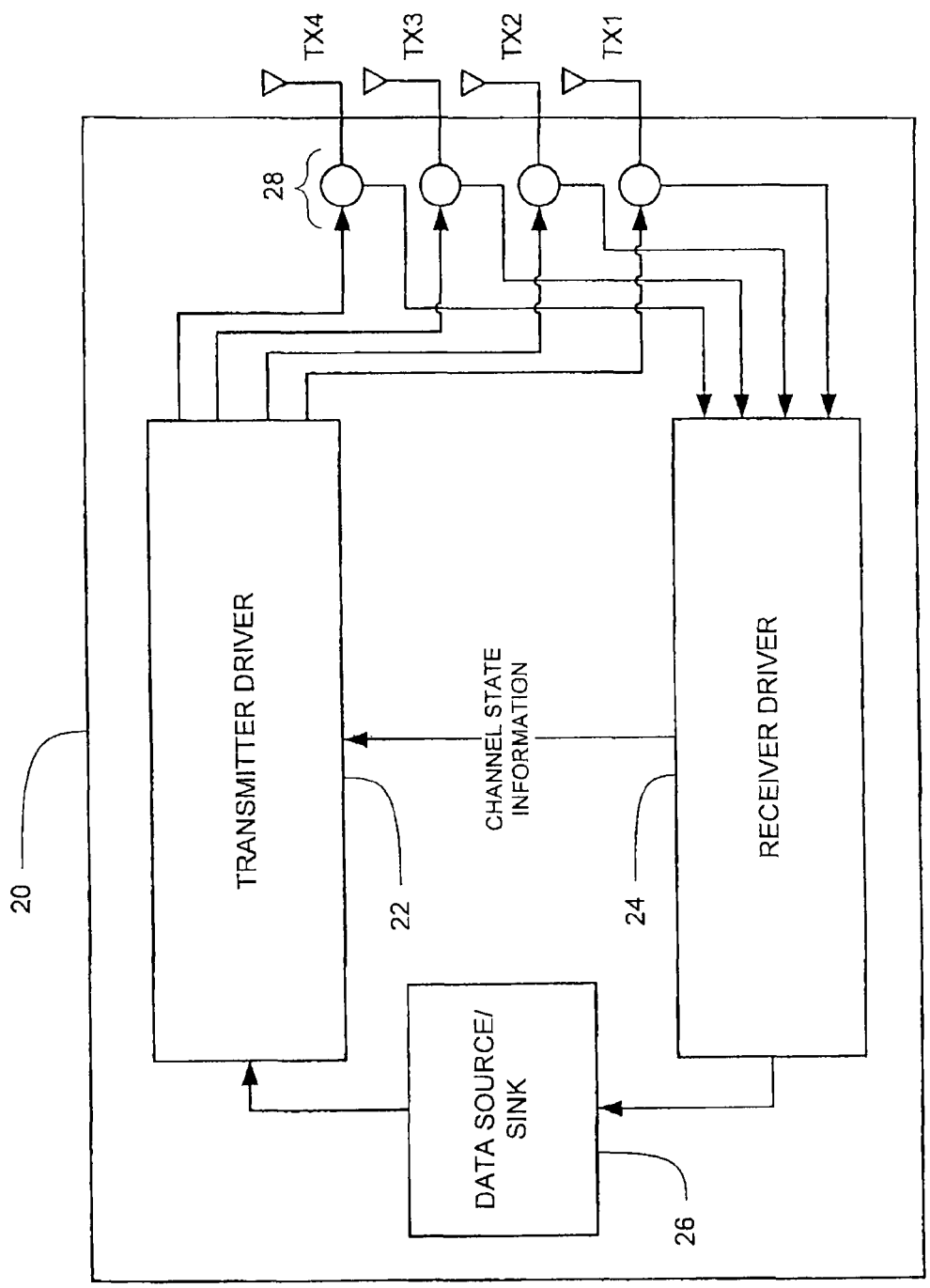
FIG. 2 is a schematic diagram of a wireless communications device in accordance with the first embodiment of the invention.

In general terms, a specific embodiment is illustrated in FIGS. 1 and 2. FIG. 1 illustrates a very schematic wireless communications system 10 comprising first and second transmit/receive devices 20, 30. Each of the transmit/receive devices 20, 30 is a multi antenna device, and antenna selection is well known to be a suitable way of making best use of the channel which can be formed between two such devices.

In use, of course, it will be understood that one or other of these transmit/receive devices may be established as a base station in a cellular network but the exact configuration of a network is not a critical aspect of the present embodiment of the invention.

Further illustrating this arrangement, FIG. 2 is a schematic diagram of the transmit/receive device 20 illustrated in FIG. 1. The device 20 comprises a transmitter driver 22 operable to receive data from a data source/sink 26 for transmission on the antennas TX1 to TX4 of the device 20. A receiver driver 24 receives and processes signals received on the same antennas and passes data to the data source sink 26 and channel state information to the transmitter driver 22. An array of suitable switches is provided to enable the antennas to be used for both transmitting and receiving.

The transmitter driver 22 is configured to transmit, as frequently as appropriate to the application, channel state information, to be received (fed back) by a corresponding device and processed by the corresponding receiver driver of that device. The structure of that channel state information, in accordance with the described embodiment, will now be described.

n×1 eigenvectors $y_1, \ldots, y_p$ are defined, representing the channel spatial structure to be fed back, and Y is defined as the n×p orthonormal matrix whose columns are the p eigenvectors. These can be obtained, for example, as the p strongest eigenvectors of the matrix product $HH^\dagger$, or some average $E(HH^\dagger)$, where H is the baseband representation of a flat fading downlink channel between a base station node (eNodeB) and a UE. Alternatively, the p vectors can be associated with the strongest right singular vectors of H, or some average E(H).

The p vectors are orthogonal and unit-norm. If a Standard mandates that they should be represented separately, without considering their orthogonality, the condition on the norm imposes one constraint per vector. Therefore, the degrees of freedom associated with each vector representation, i.e. the number of (complex) coefficients required to represent each vector is n−1. It will be appreciated that, without loss of generality, it can be assumed that the first element of each eigenvector (or singular vector) is real-valued. Collectively, $$np - p \tag{1}$$

coefficients must be encoded to represent the p vectors.

The above representation is redundant as the orthogonality constraints between the vectors is not considered. In fact, if a Standard mandates that the vectors should be represented jointly, for the first vector the norm still imposes a single constraint, for the second vector one constraint is imposed by the norm and one by the orthogonality to the first vector, for the third vector there are two orthogonality constraints and one norm constraint and so forth for the remaining vectors. Therefore, the overall degrees of freedom in the representation are:

$$\sum_{i=1}^{p} (n-i) = np - \frac{p(p+1)}{2}. \tag{2}$$

This is a more efficient way of conveying the same information as in the separate representation.

In the present embodiment, a yet further efficient representation of the subspace spanned by the p vectors is used. This is based on the observation that, for the purpose of interference nulling, the transmitter does not need exact knowledge of the orthonormal matrix Y. Instead, the vector sub-space spanned by its columns is sufficient. In other words, the transmitter should be able to reconstruct an arbitrary linear combination of the columns of Y, i.e. a matrix Y'=YQ, where Q is an arbitrary p×p unitary matrix, unknown to the transmitter.

The reader will appreciate the reason why this does not affect the nulling capability of the transmitter. A precoding vector belongs to the null-space of Y if and only if it belongs to the null space of Y'. Therefore, as it is desirable for the transmitter to form a beam that does not interfere with the channel space represented by the eigenvectors of Y, it can equivalently choose a vector from the null space of Y or Y'. This MIMO transmit processing requirement is common to many configurations, such as single-cell MU-MIMO with zero-forcing precoding or multi-cell (CoMP) cooperative beamforming. The interference nulling capability may also be the preferred interference reduction technique in heterogeneous deployments of macro-cells and femto- or hotzone-cells.

The degrees of freedom of this sub-space representation are obtained by subtracting from the degrees of freedom of Y (given by equation (2)), those of the square Q matrix, also given by an equation of the form of equation (2) but replacing n with p). Thus, the number of (complex) coefficients associated with the new representation is $$\left(np - \frac{p(p+1)}{2}\right) - \left(p^2 - \frac{p(p+1)}{2}\right) = np - p^2 \tag{3}$$

It is self evident that $$(np - p^2) < \left(np - \frac{p(p+1)}{2}\right) < (np - p)$$

for p>1.

More specifically, if a unit cost is associated with the representation of each coefficient, for example number of feedback bits per coefficient, and the initial vector-by-vector representation is established as a baseline, the percentage overhead reduction achievable with the subspace representation of the present embodiment can be determined. This is set out in Table 1, which sets out the degrees of freedom and overhead reduction in the representation of the spatial structure of a MIMO channel. In the table, n is the number of transmit antennas, and p the number of reported channel eigenvectors. The sub-space representation of the present specific embodiment is compared to separate and joint eigenvector representation:

TABLE 1

| | Separate eigenvector representation (baseline) | Joint eigenvector representation | Sub-space representation |
|---|---|---|---|
| Degrees of freedom per eigenvector (when reporting p eigenvectors) | n − 1 | $n - \frac{p+1}{2}$ | n − p |

TABLE 1-continued

|  | Separate eigenvector representation (baseline) | Joint eigenvector representation | Sub-space representation |
|---|---|---|---|
| Overhead reduction with respect to baseline | 0 | $\dfrac{p-1}{2(n-1)}$ | $\dfrac{p-1}{n-1}$ |

It is notable that, with the arrangement as set out in the above described specific embodiment, the equivalent overhead of (p−1) coefficients can be saved, as opposed to previous arrangements, for each eigenvector representation, when signalling p eigenvectors. (p−1)/2 coefficients are saved per vector on the more efficient joint eigenvector representation.

Figure 3:
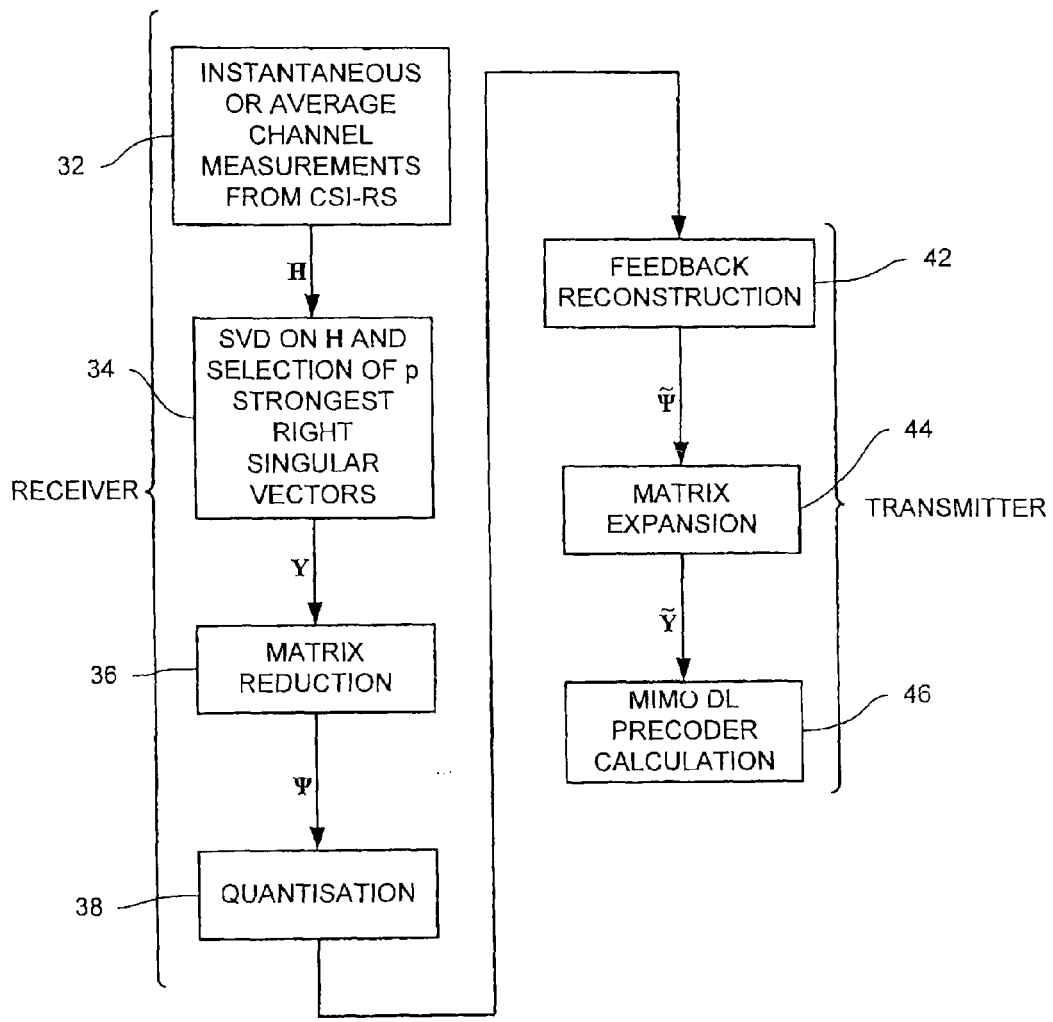
FIG. 3 is a flow diagram of a process for generating and using channel state feedback information in accordance with the first embodiment of the invention.

FIG. 3 describes in general terms the stages of data processing and transmission which are undertaken in order to furnish a transmitter with channel state information in accordance with the specific embodiment.

At the receiver, there is an initial step 32 of gathering channel state information on the signal received at the receiver. This may be as an instantaneous measurement, or an average over a period of time.

Then, singular value decomposition is performed (34) on the resultant channel matrix. The p strongest right singular vectors are chosen for further processing, designated as the matrix Y for further processing.

From a structural perspective, the distinction between the feedback generation mechanism of the present embodiment, and that of the prior art, is in a compression stage 36 carried out before a quantisation block 38. This operation is named "matrix reduction" in the block diagram of FIG. 3 and will now be described.

This matrix reduction operation adds little complexity to the feedback generation procedure at the UE as will be understood from the following description thereof; it comprises mainly an additional singular value decomposition (SVD) performed on a small p×p matrix.

The reverse operation required at the transmitter to expand the encoded feedback, after reconstruction, into a set of orthonormal vectors, is depicted in FIG. 3 as a "matrix expansion" block. This block also entails an SVD operation on an (n−p)×p matrix, which amounts to a small increase in the transmitter complexity.

The "matrix reduction" operation (36) of FIG. 3 will now be described in further detail. It should be noted that the number of reported eigenvectors, p, cannot be greater than the number of transmit antennas, and therefore it can be assumed that n≥p.

Figure 4:
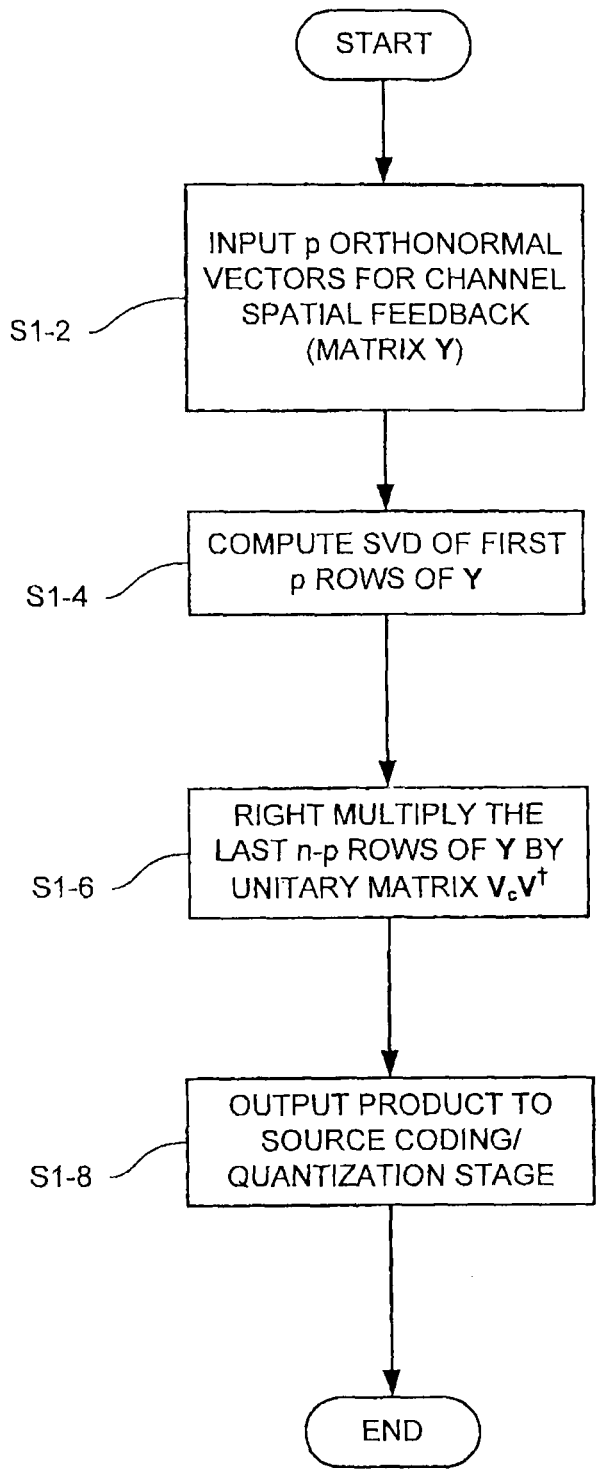
FIG. 4 is a flow diagram of a process of matrix reduction in the process illustrated in FIG. 3.

The matrix Y containing the set of p orthonormal vectors is input to the block (step s1-2 in FIG. 4) and is partitioned as follows $$Y = \begin{pmatrix} Y_p \\ Y_{n-p} \end{pmatrix},$$

where $Y_p$ is a p×p matrix consisting of the first p rows of Y, while $Y_{n-p}$ contains the remaining n−p rows. The SVD (singular value decomposition) of $Y_p$ is then taken (step S1-4):

$$Y_p = V\Sigma_c V_c^\dagger. \tag{4}$$

The new reduced-size (n−p)×p matrix to be quantised and fed back is given by $\Psi = Y_{n-p} V_c V^\dagger$ (step S1-6) where (by definition) $V_c V^\dagger = Q$ is a p×p unitary matrix.

The resultant matrix Ψ is then output (step S1-8) to the source coding and quantization stage (38).

At the transmitter side, the received feedback is reconstructed (42) and then the reconstructed feedback data matrix is re-expanded (44). The resultant matrix of orthonormal vectors Y' can then be used in determining a precoder (46) for further MIMO transmissions.

Figure 5:
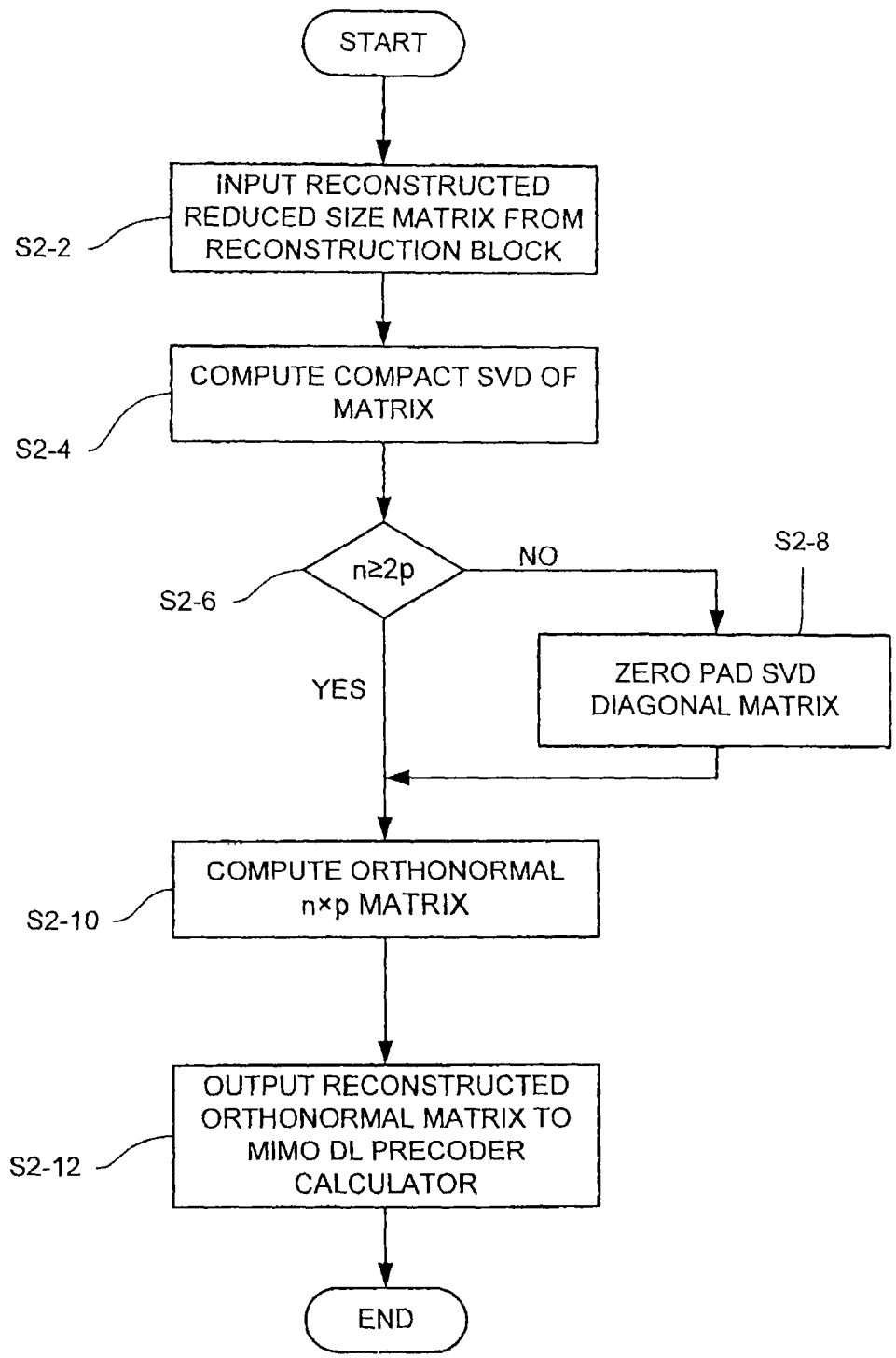
FIG. 5 is a flow diagram of a process of matrix reconstruction in the process illustrated in FIG. 3.

The "matrix expansion" operation (44) at the transmitter side of the feedback link is carried out as follows. For notational convenience it is assumed that the quantisation and reconstruction blocks do not introduce any distortion on Ψ, which is input to the process in step S2-2 in FIG. 5. The matrix expansion block takes the compact SVD of the reconstructed Ψ (step S2-4):

$$\Psi = U_1 \Sigma_s V_1^\dagger \tag{5}$$

and computes the orthonormal n×p matrix (step S2-10), if n≥2p, as follows:

$$Y' = \begin{pmatrix} V_1(I_p - \Sigma_s^2)^{1/2} V_1^\dagger \\ U_1 \Sigma_s V_1^\dagger \end{pmatrix} \tag{6}$$

which is then output in step S2-12.

The key property is that the columns of Y' and Y span the same subspace, namely it can be shown that:

$$Y' = YQ. \tag{7}$$

To show this, it should be observed that, in equation (4), the singular values are the cosines of the principal angles between the sub-space spanned by the columns of Y and the p reference axes given by the columns of the matrix $$\begin{pmatrix} I_p \\ 0_{(n-p)\times p} \end{pmatrix}.$$

By taking the compact SVD of the block $Y_{n-p}$, $$Y_{n-p} = U\Sigma_s V_s^H,$$

is obtained, where the singular values are the sines of the principal angles identified above and $V_s$ is obtained from a permutation and possible sign change of the columns of $V_c$. Thus, $$V_s = V_c P,$$

with P generalised permutation matrix, such that $P^{-1} = P^H$. It should be noted that, by definition of the sine and cosine function, $P(I_p - \Sigma_s^2)^{1/2} P^H = \Sigma_c$. By plugging the above SVD into the definition of Ψ, the result is:

$$\Psi = U\Sigma_s P^H V^H,$$

and by comparison with (5), it follows that $V_1 = VPD$ and $U_1 = UD$, where D is a diagonal matrix with complex exponentials on the diagonal, such that $D^{-1} = D^H$. Finally, the top block in (6) can be rewritten as follows:

$$V_1(I_p - \Sigma_s^2)^{1/2} V_1^H = VPD(I_p - \Sigma_s^2)^{1/2} D^{-1} P^{-1} V^H = V\Sigma_c V^H = Y_p Q,$$

which, along with the definition of Ψ, proves (7).

By using this procedure, the spatial information embedded in Y can be conveyed with the fewest coefficients: p(n−p), i.e. the elements of the matrix Ψ.

The case p≤n<2p will now be considered. This is distinguished from the alternative by a check made after computing the compact SVD (step S2-4) in step S2-6.

In this case, a minor modification must be introduced to the reconstruction operation in equation (6) because the matrix $\Psi$ has only $(n-p)<p$ non-zero singular values and $\Sigma_s$ is $(n-p) \times p$ in size. Accordingly, $\Sigma_s$ must be extended with zeros before inserting it in equation (6), that is (in step S2-8):

$$\Sigma_s \rightarrow \begin{pmatrix} \Sigma_s \\ 0_{(2p-n) \times p} \end{pmatrix}.$$

The geometrical explanation for this zero-padding is that the diagonal elements of $\Sigma_c$ are the principal cosines of the subspace Y with respect to the reference axes $$\begin{pmatrix} I_p \\ 0_{(n-p) \times p} \end{pmatrix}$$

If $p \leq n < 2p$, then $2p-n$ such principal cosines are equal to 1, hence $2p-n$ principal sines are equal to 0, which is the reason why the diagonal matrix containing the principal sines, $\Sigma_s$, has to be extended with $2p-n$ diagonal zeros.

Equations (5) to (7) can be conveniently used for conformance testing, to test if the compression method is implemented by a terminal. From the channel measurements, in the form of the H matrix, (or directly from the eigenvectors $y_1, \ldots, y_p$) and from the feedback information, it is straightforward to check if equation (7) is satisfied.

It should also be noted that any conventional source coding technique can be used to further compress and quantise the matrix $\Psi$, to generate the actual feedback bits: amongst the others, codebook-based vector/matrix quantisation or various forms of scalar quantisation of the matrix elements.

The above described compression scheme allows for reduction of the number of coefficients that are required to be encoded in order to feed back the spatial structure of a MIMO channel, thus reducing the uplink overhead required for feedback in single-cell or multi-cell DL (downlink) MIMO. This is achieved with little added complexity (one small SVD operation) at both ends of the communications channel.

While the above matrix operations are expressed in a certain manner, predicating right multiplication in specific steps, it will be understood that mathematically an alternative approach can be developed which involves left multiplication. No implicit limitation is to be placed on the scope of the present disclosure by virtue of this feature of the description.

The reader will appreciate that the foregoing is intended to illustrate an example of the invention, and no limitation on the scope of protection is to be imputed therefrom. The scope of protection sought is set out in the attached claims, which are to be read in the light of the description (but not limited thereby) with reference to the accompanying drawings.

Whilst certain embodiments have been described, these embodiments have been presented by way of example only, and are not intended to limit the scope of the inventions. Indeed, the novel methods, apparatus, products and systems described herein may be embodied in a variety of other forms; furthermore, various omissions, substitutions and changes in the form of the methods, apparatus, products and systems described herein may be made without departing from the spirit of the inventions. The accompanying claims and their equivalents are intended to cover such forms or modifications as would fall within the scope and spirit of the inventions.

The invention claimed is:

1. A method of compressing data for transmission in a first direction across a communications channel, the data representing channel conditions for the communications channel in a direction opposite to the first direction, comprising;
    arranging the data as a matrix comprising a number of orthonormal vectors derived from a channel matrix;
    determining a singular value decomposition of a subset of the orthonormal matrix to generate matrices respectively of left and right singular vectors, the number of vectors in the subset being equal to the order of the vectors; and
    right multiplying the remainder orthonormal vectors not included in the singular value decomposition by a matrix product of the matrix of right singular vectors and the matrix of left singular vectors to generate a matrix of compressed data.

2. The method in accordance with claim 1, further comprising:
    deriving said orthonormal vectors from a channel matrix representing the channel conditions of the communications channel in said opposite direction.

3. A method of decoding a channel representation comprising reversing the method in accordance with claim 1 to reconstruct an orthonormal $n \times p$ matrix from a $(n-p) \times p$ block.

4. A non-transitory computer program product comprising computer executable instructions operable to configure a general purpose computerised communications device to perform the method in accordance with claim 1.

5. The non-transitory computer program product in accordance with claim 4 and comprising a computer readable storage medium.

6. A method of decompressing compressed data, said data being arranged as a square matrix, comprising determining a singular value decomposition of the square matrix, constructing a matrix Y'comprising:

$$Y' = \begin{pmatrix} V_1 (I_p - \Sigma_s^2)^{1/2} V_1^\dagger \\ U_1 \Sigma_s V_1^\dagger \end{pmatrix}$$

where $V_1$ is a right singular value matrix resultant from said singular value decomposition, $U_1$ is a left singular value matrix resultant from said singular value decomposition, and $\Sigma_s$ is a diagonal matrix resultant from said singular value decomposition.

7. A method for compressing the representation of a set of channel eigenvectors, in a channel state information (CSI) feedback scheme, comprising jointly encoding a set of p n-dimensional eigenvectors, with $n \geq p$, by using $n-p$ coefficients per vector.

8. The method in accordance with claim 7 wherein encoding comprises arranging the set of eigenvectors in an $n \times p$ orthonormal matrix, taking a singular value decomposition (SVD) of the top $p \times p$ block of the matrix, and multiplying the bottom $(n-p) \times p$ matrix block by the SVD output to determine a channel representation.

9. A wireless communications apparatus operable to receive a signal from the wireless communications apparatus is able to derive channel state information, and operable to emit a signal to convey said derivation of channel state information, and comprising channel state information compression means operable to compress said derivation of channel state information, the channel state information compression means comprising data arranging means for arranging the data as a matrix comprising a number of orthonormal vectors derived from a channel matrix, singular value decomposition determining means for determining a singular value decomposition of a subset of the orthonormal matrix to generate matrices respectively of left and right singular vectors, the number of vectors in the subset being equal to the order of the vectors, and matrix multiplying means operable to right multiply the remainder orthonormal vectors not included in the singular value decomposition by a matrix product of the matrix of right singular vectors and the matrix of left singular vectors to generate a matrix of compressed data.

10. A wireless communications apparatus operable to receive a signal conveying a derivation of channel state information arranged as a square matrix, comprising signal decompression means comprising singular value decomposition determination means for determining a singular value decomposition of the square matrix, and matrix construction means for constructing a matrix Y' comprising:

$$Y' = \begin{pmatrix} V_1(I_p - \Sigma_s^2)^{1/2} V_1^\dagger \\ U_1 \Sigma_s V_1^\dagger \end{pmatrix}$$

where $V_1$ is a right singular value matrix resultant from said singular value decomposition, $U_1$ is a left singular value matrix resultant from said singular value decomposition, and $\Sigma_s$ is a diagonal matrix resultant from said singular value decomposition.

11. The wireless communications apparatus in accordance with claim 10 and operable to generate a precoding scheme on the basis of received channel state information.

12. A wireless communications system comprising a wireless communications apparatus operable to receive a signal from which the wireless communications apparatus is able to derive channel state information, and operable to emit a signal to convey said derivation of channel state information, and comprising channel state information compression means operable to compress said derivation of channel state information, the channel state information compression means comprising data arranging means for arranging the data as a matrix comprising a number of orthonormal vectors derived from a channel matrix, singular value decomposition determining means for determining a singular value decomposition of a subset of the orthonormal matrix to generate matrices respectively of left and right singular vectors, the number of vectors in the subset being equal to the order of the vectors, and matrix multiplying means operable to right multiply the remainder orthonormal vectors not included in the singular value decomposition by a matrix product of the matrix of right singular vectors and the matrix of left singular vectors to generate a matrix of compressed data, in wireless communication with a wireless communications apparatus operable to receive a signal conveying a derivation of channel state information arranged as a square matrix, comprising signal decompression means comprising singular value decomposition determination means for determining a singular value decomposition of the square matrix, and matrix construction means for constructing a matrix Y' comprising:

$$Y' = \begin{pmatrix} V_1(I_p - \Sigma_s^2)^{1/2} V_1^\dagger \\ U_1 \Sigma_s V_1^\dagger \end{pmatrix}$$

where $V_1$ is a right singular value matrix resultant from said singular value decomposition, $U_1$ is a left singular value matrix resultant from said singular value decomposition, and $\Sigma_s$ is a diagonal matrix resultant from said singular value decomposition.

* * * * *